United States Patent [19]

Yoshimura et al.

[11] Patent Number: 5,139,713
[45] Date of Patent: Aug. 18, 1992

[54] METHOD OF PREPARING URETHANE FOAM ARTICLES

[75] Inventors: Kimio Yoshimura, Urawa; Satoshi Narumi, Tokyo, both of Japan

[73] Assignee: Tokyo Sheet Co., Ltd., Saitama, Japan

[21] Appl. No.: 546,852

[22] Filed: Jul. 2, 1990

[30] Foreign Application Priority Data

Jun. 30, 1989 [JP] Japan .................................. 1-167005

[51] Int. Cl.$^5$ ............................................. B29C 67/20
[52] U.S. Cl. .................................... 264/45.5; 264/54; 264/DIG. 14
[58] Field of Search ................. 264/45.5, DIG. 14, 54

[56] References Cited

U.S. PATENT DOCUMENTS

| | | | |
|---|---|---|---|
| 2,858,881 | 11/1958 | Newall et al. | 264/DIG. 14 |
| 3,182,104 | 5/1965 | Cwik | 264/45.5 |
| 3,523,918 | 8/1970 | Gonzales | 264/DIG. 14 |
| 4,483,974 | 11/1984 | Grögler et al. | 264/45.5 |
| 4,576,970 | 3/1986 | Ganster et al. | 264/45.5 |
| 4,636,531 | 1/1987 | Schmidt et al. | 264/45.5 |

*Primary Examiner*—James Lowe
*Attorney, Agent, or Firm*—Hill, Van Santen, Steadman & Simpson

[57] ABSTRACT

In a method of preparing a urethane foam article having a high density outer surface layer, of the type wherein a plastic liquid containing isocyanates, polyols, a catalyst, a blowing agent, an assistant and other additives is poured into a mold through a one-shot molding process, while maintaining the mold at a temperature in the range of from 15° to 40° C., a temperature sensitive catalyst is added for causing the isocyanates and the blowing agent to create a difference in chemical reaction between an outer portion of the plastic liquid contacting the mold surface and an inner portion of the plastic liquid held out of contact with the mold surface, thereby retarding the foaming of the outer portion than that of the outer portion. Subsequently, a evolved gas is allowed to expand under exothermic heat of the inner portion of the plastic liquid while at the same time the evolved gas is taken up by gelation of the plastic liquid, thereby increasing the blowing pressure rapidly until the mold is over-packed with a foaming plastic mass. Finally, an outer portion of the foaming plastic mass extending along the mold surface is gelled while inhibiting the foaming of the last-mentioned outer portion, thus forming a high density layer on the outer surface of a urethane foam article.

11 Claims, 2 Drawing Sheets

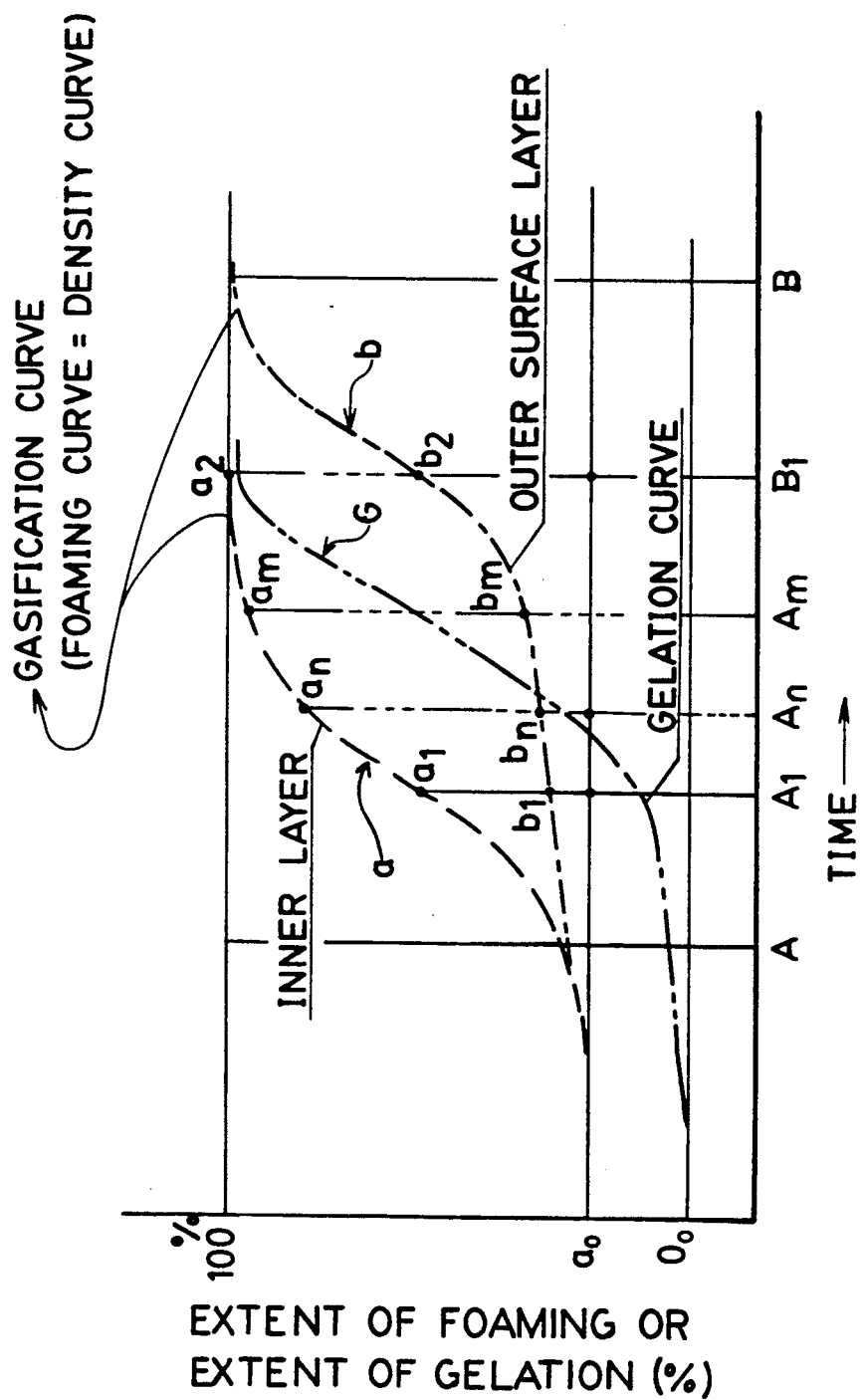

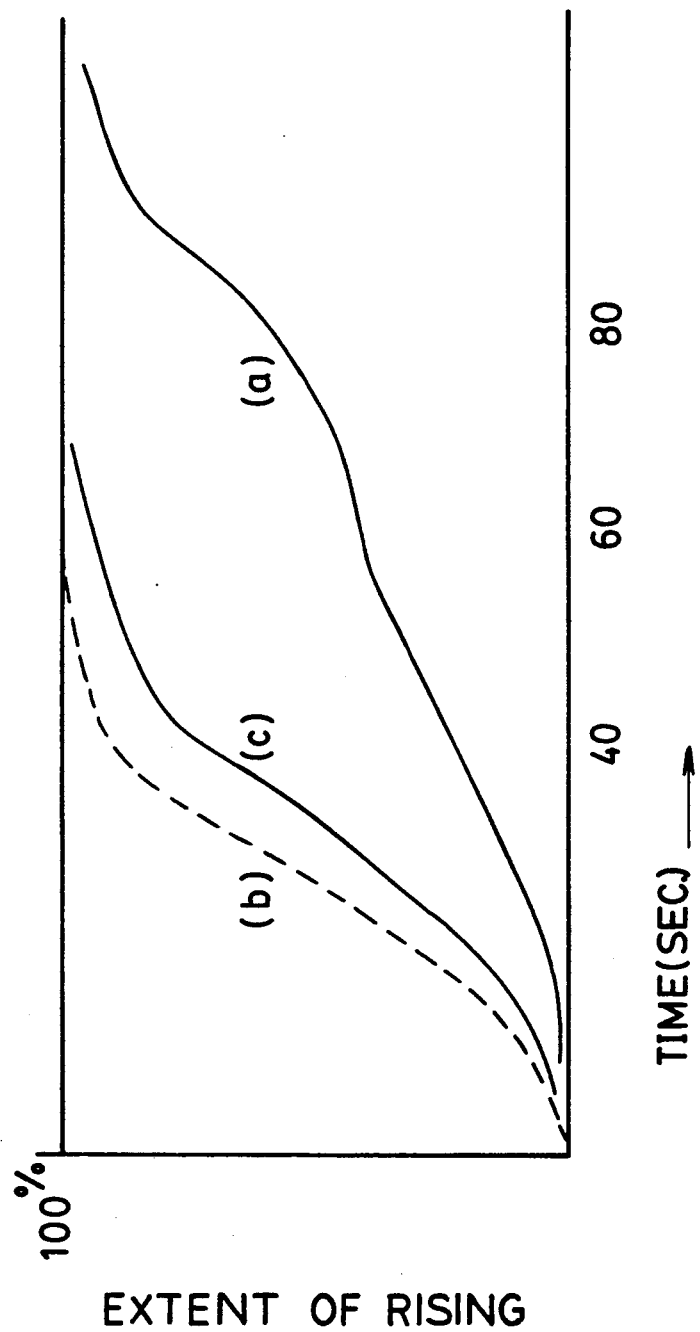

METHOD OF PREPARING URETHANE FOAM ARTICLES

BACKGROUND OF THE INVENTION

1. Field of the Invention

The present invention relates generally to the manufacture of urethane foam articles, and more particularly to a method of preparing urethane foam articles having a high density outer surface layer suitable for use as interior parts of an automobile, a ship, etc., or component parts of a furniture.

2. Description of the Prior Art

In the manufacture of urethane foam articles having a high density outer surface layer, it has been customarily practice to use a low-melting chlorofluorocarbon blowing agent such as CFC-11 or CFC-113 together with a catalyst such as 1,4-diazabicyclo(2,2,2)octane or dibutyltin dilaurate.

During the reactions that produce a urethane foam, the heat of reaction is conducted to a metal mold, thereby creating a temperature difference in the foaming plastic mass. This temperature difference varies the vaporization rate of a low-melting solvent (blowing agent) such as CFC-11 or CFC-113 which has been mixed with and homogeneously compatibilized in a urethane stock solution, so that an outer portion of the foaming plastic mass which contacts the mold surface forms a high density outer surface layer, while an inner portion of the foaming plastic mass which is held out of contact with the mold surface has a cellular structure. As the reaction advances, the mold cavity is filled with foam or bubbles and the blowing pressure in the mold rises. In this instance, gases trapped in those foams which are contacting the mold surface are condensed and then absorbed or recompatibilized in the reacting plastic mass. Thus, the high density outer surface layer is thickened. In this condition, the foaming plastic mass is forced into rapid gelation or polymerization to set the shape of the high density outer surface layer and the inner cellular layer. A urethane foam article having a foam core and a high density outer surface layer is thus formed by a single foam molding operation of the same urethane stock solution. The conventional manufacture of such urethane foam article having a high density outer surface layer involves the consumption of CFC-11 or CFC-113.

Since CFC-11 and CFC-113 are completely halogenated hydrocarbon blowing agents including fluorine and chlorine, the consumption of CFC-11 and CFC-113 causes a breakage or destruction of the ozone layer in the stratosphere which will permit a great amount of detrimental ultraviolet rays (especially UVB, 320–280 nm) to reach the ground of the earth. The detrimental ultraviolet rays bring about various serious problems such as the mutation, deactivation and damaging of genes and cells, an increased number of cutaneous cancer, a change of the ecosystem, and the greenhouse effect resulting from an increase in the atmospheric temperature.

With the foregoing problems in view, there has been an increased demand for a technique for the preparation of a urethane foam article having a high density outer surface layer either with the use of a reduced amount of CFC-11 or CFC-113 as a blowing agent, or without the use of CFC-11 or CFC-113. Such technique may include (1) a production using a low-melting combustible solvent, (2) a substituted formation of a thick high density outer surface layer by the in-mold coating process, or (3) a production employing the gas-loading process using dry air or nitrogen gas.

The foregoing techniques are not satisfactory due to the possibility of an accidental firing of the combustible solvent, the necessity of an additional heating of a semi-finished product for removing the combustible gas, a high toxicity of the combustion gas and rust created thereby, and a high reconstruction cost of the manufacturing equipment. Furthermore, the high density outer surface layer formed by any of these techniques is not satisfactory in quality.

SUMMARY OF THE INVENTION

Through continued research leading to the invention, the present inventors have found that a urethane foam article having a high density outer surface layer can be prepared with a considerably reduced use of a low-melting solvent such as CFC-11 and CFC-113 or without using such low-melting solvent. The term "temperature sensitive catalyst" used herein and in the claims is intended to include those catalysts having alternative properties such that they have a strong temperature dependence when reacted with the blowing agent, while they exhibit a small temperature dependence and create a relatively small difference in reaction when reacted with isocyanates, polyols, a crosslinking agent and other additives.

It is therefore an object of the present invention to provide a method capable of preparing a urethane foam article having a high density outer surface layer, with a considerably reduced use of a halogenated hydrocarbon blowing agent containing fluorine and chlorine, or without the use of such halogenated hydrocarbon blowing agent.

According to the present invention, there is provided a method of preparing a urethane foam article having a high density outer surface layer, of the type wherein a plastic liquid containing isocyanates, polyols, a catalyst, a blowing agent, an assistant and other additives is poured into a mold through a one-shot molding process, wherein the improvement comprises:

maintaining the mold at a temperature in the range of from 15° to 40° C.;

while maintaining said mold temperature, adding a temperature sensitive catalyst for causing the isocyanates and the blowing agent to create a difference in chemical reaction between an outer portion of the plastic liquid contacting the mold surface and an inner portion of the plastic liquid held out of contact with the mold surface, thereby retarding the foaming of the outer portion mold than that of the inner portion;

subsequently allowing an evolved gas to expand under exothermic heat of the inner portion of the plastic liquid and simultaneously taking up the evolved gas by gelation of the plastic liquid, thereby increasing the blowing pressure rapidly until the mold is over-packed with a foaming plastic mass; and gelling an outer portion of the foaming plastic mass extending along the mold surface while inhibiting the foaming of the last-mentioned outer portion, thereby forming a high density layer on the outer surface of a urethane foam article.

The above and other objects, features and advantages of the present invention will become manifest to those versed in the art upon making reference to the detailed description and the accompanying sheets of drawings.

BRIEF DESCRIPTION OF THE DRAWINGS

FIG. 1 is a graph showing the relationship between the extent of foaming of an outer portion of the urethane stock solution contacting a mold surface, the extent of foaming of an inner portion of the urethane stock solution held out of contact with the mold surface, and the extent of gelation of the urethane stock solution that are plotted with respect to time; and FIG. 2 is a graph showing a change of the extent of foaming of the outer portion of the urethane stock solution and a change of the extent of foaming of the inner portion of the urethane stock solution which are plotted with respect to time.

DETAILED DESCRIPTION OF THE INVENTION

As noted above, the present invention involves an improved method of preparing a urethane foam article having a high density outer surface layer, of the type wherein a plastic liquid containing isocyanates, polyols, a catalyst, a blowing agent, an assistant and other additives is poured into a mold through a one-shot molding process, characterized by maintaining the mold at a temperature in the range of from 15° to 40° C.; while maintaining said mold temperature, adding a temperature sensitive catalyst for causing the isocyanates and the blowing agent to create a difference in chemical reaction between an outer portion of the plastic liquid contacting the mold surface and an inner portion of the plastic liquid held out of contact with the mold surface, thereby retarding the foaming of the outer portion more than that of the inner portion; subsequently allowing a evolved gas to expand under exothermic heat of the inner portion of the plastic liquid and simultaneously taking up the evolved gas by gelation of the plastic liquid, thereby increasing the blowing pressure rapidly until the mold is over-packed with a foaming plastic mass; and finally gelling an outer portion of the foaming plastic mass extending along the mold surface while inhibiting the foaming of the last-mentioned outer portion, thereby forming a high density layer on the outer surface of a urethane foam article.

It is preferred that the plastic liquid is maintained at a temperature in the range of 15-30° C.

The blowing agent preferably comprises water. In order to provide an enhanced retarding of the foaming reaction, the blowing agent may comprise water absorbed in a water absorptive resin.

The temperature sensitive catalyst used in this invention may include (1) N,N',N"-tris(dimethylaminopropyl) hexahydro-S-triazine, an organic acid metal salt of N,N',N"-tris(dimethylaminopropyl) hexahydro-S-triazine or a combination thereof, (2) an imidazole ether compound, (3) a material selected from the group consisting of 1-substituted imidazole compound, 1,8-diazabicyclo(5,4,O)-7-undecene and an organic acid salt thereof, and any combination of the substances designated by (1)-(3).

Among the catalysts used in the present method, N,N',N"-tris(dimethylaminopropyl)hexahydro-S-triazine, an organic acid metal salt of N,N',N"-tris(dimethylaminopropyl) hexahydro-S-triazine or a combination thereof may be a product commercially available as PolyCAT41 or PolyCAT42 manufactured by Air Products and Chemicals, Inc. and sold by San-Apro Limited.

The imidazole ether compound used in this invention as a catalyst may include 1,1'-(oxydiethylene)bis(2-methylimidazole) and 1,1'(oxydiethylene)bis(imidazole) which are described in Japanese Patent Application No. 63-158919.

The 1-substituted imidazole compound used in the present invention may include 1-methylimidazole, 1-ethylimidazole, 1,2-dimethylimidazole, 1-ethyl-2-methylimidazole. Among these imidazole compounds, 1,2-dimethylimidazole is preferable. These imidazole compounds may be used separately or in combination.

1,8-diazabicyclo(5,4,0)-7-undecene and an organic acid salt thereof used as a catalyst in this invention are products commercially available as DBU and U-CAT-SAI from San-Apro Limited.

The ratio of the 1-substituted imidazole compound to 1,8-diazabicyclo(5,4,Q)-7-undecene to the organic acid salt of 1,8-diazabicyclo(5,4,0)-7-undecene is 1:0.5-1:1.5, and preferably 1:0.7-1:1.2.

The amount of the catalyst used for the formation of a semi-rigid urethane foam having a high density outer portion is in the range of from 0.3 to 3.0 parts by weight, and preferably from 0.6 to 1.8 parts by weight per 100 parts by weight of the polyol component.

According to the present invention, the catalyst stated above is used in combination with a blowing agent consisting of water, and the mold is heated at a temperature in the range of from 15° to 40° C., and preferably 20° C.±5° C. before the pouring of a homogeneously stirred plastic liquid. This heating temperature is considerably lower than the heating temperature (45-60° C.) of the conventional method in which a low-melting solvent such as CFC-11 is used. When a urethane foam article having a semi-rigid high density outer surface layer is to be prepared, the homogeneously stirred plastic liquid is kept at a temperature within the range of 15-30° C., and preferably maintained at 20° C.±3° C. and then poured into the mold. With this temperature control, foaming of the plastic liquid is retarded in the vicinity of the inside surface of the mold, while an inner part of the plastic liquid held out of contact with the mold surface is allowed to foam and start to gel under heat produced during the exothermic reaction. This causes a rapid increase in the blowing pressure in the mold which will create a so-called "over-packing" condition. Under such over-packing condition, the gelation occurs rapidly with a further inhibition of the foaming of the outer part of the plastic liquid, thus forming a high density outer surface layer.

When a thinner high density outer surface layer is to be formed, the preparation temperature of the plastic liquid (urethane stock solution) used is increased from 20° C.±3° C. toward 30° C. Further, the density of the outer surface layer is to be lowered, the temperature of the mold is increased from 20° C.±5° C. toward 40° C. until an outer surface layer of a desired density is obtained. Optimum conditions may be previously determined by experiments.

The foregoing temperature controlling conditions may be varied concurrently with a change in the amount of the gas evolving substance (blowing agent) added.

The method of the invention which is provided for the formation of a urethane foam article having a high density outer surface layer is theoretically described with reference to FIG. 1. As is apparent from FIG. 1, an inner layer and an outer surface layer differ in their extent of foaming (the magnitude of blowing or the density) during a time period between A and B. If a foaming liquid is fully loaded or packed in a mold at any time during this time period and gelation by polymerization of the foaming liquid is completed as indicated by a gelation curve "G" at the time $B_1$ the density of the inner layer and the density of the outer surface layer are set at $a_2$ and $b_2$, respectively. Thus, the outer surface layer is an integral layer of a higher density than the inner layer.

While keeping the differences in density between $a_1$ and $b_1$ and between $a_2$ and $b_2$, the mold is filled with the foaming liquid at any time during the time period between $A_1$ and $B_1$. In this instance, the foaming liquid thus loaded has a corresponding difference in density between the outer surface layer and the inner layer. Then the gelation by polymerization of the foaming liquid is completed. After a reactive plastic liquid (urethane stock solution) is poured into a mold, the mold is completely filled with the foaming liquid at a time when the following equation (1) holds between the volume equivalent to the respective extents of foaming $a_1$ and $b_1$ on the foaming curves a and b.

$$[a_0+(a_1-a_0)+(b_1-a_0)] = \text{volume of a space in the mold} \quad (1)$$

where $a_0$ is the density of the plastic liquid (urethane stock solution) immediately after the pouring which is equivalent to zero level foaming.

When a desired time An is selected from the time period $A_1$-$B_1$, the respective foaming extents $a_n$ and $b_n$ of the inner layer and the outer surface layer are obtained from the foaming curves a and b. In this instance, the amount of amount of the plastic liquid (urethane stock solution) to be poured into the mold can be determined in such a manner that the following equation (2) holds.

$$[a_0+(a_n-a_0)+(b_n-a_0)] = \text{volume of a space in the mold} \quad (2)$$

The gel time of the foaming liquid fully packed in the mold is determined by an appropriate adjustment of the reactivity of the plastic liquid (urethane stock solution) so that the gelation based on polymerization is completed while keeping the difference in density at a desired time selected from a time period $A_n$-$B_1$.

The difference in density created after pouring of the plastic liquid (urethane stock solution) is obtained by $a_1-b_1$ provided that the mold cavity is filled due to initial foaming of the plastic liquid at the time Al. Since the foaming of the inner layer further proceeds rapidly under heat generated by the exothermic reaction, as compared to the outer surface layer, the blowing pressure in the mold goes up rapidly. With this rapid pressure rise, and additionally due to the thermal conduction to the mold which is previously maintained at a low temperature, the foaming of the outer surface layer is restricted to an unfoamed or low-foaming condition. Under such condition, the gelation based on polymerization of the foaming liquid is completed at a time $A_m$ of the time period $A_n$-$B_1$, thus obtaining a difference in density $a_m-b_m$. If $A_m = B_1$, the inner layer and the outer surface layer are set at respective densities of $a_2$ and $b_2$. As seen from FIG. 1, the outer surface layer thus formed is an integral layer of a higher density than the inner surface layer.

Polyols used in this invention include all those known to the art, such as polyetherpolyol having a structure including alkylene oxide (ethylene oxide, propylene oxide, etc) added to a low-molecular polyol (ethylene glycol, propylene glycol, glycerin, trimethylolpropane, triethanolamine, pentaerythritol, sorbitol, cane sugar, etc) and polyamine (ethylenediamine, diethylentriamine, tolylenediamine, xylylenediamine, piperazine, N-aminoalkylpiperazine, cyclohexylenediamine, etc), polymer polyol (disclosed for example in U.S. Pat. No. 3,383,351) obtained by reacting polyetherpolyol with ethylenic unsaturated monomer (acrylonitrile, styrene, methyl methacrylate, butadiene, etc.), and polyester obtained by reacting polycarboxylic acid (succinic acid, maleic acid, sebacic acid, adipic acid, fumaric acid, phtalic acid, dimer acid, etc) with the above-mentioned low-molecular polyol.

Among these polyols, a polyol which is suitable for the formation of a semi-rigid urethane foam article having a high density outer surface layer is polyetherpolyol including ethylene oxide added to the end group of polypropylenepolyol added with polypropylene oxide such as bi- to tri-functional propylene glycol, glycerin and trimethylolpropane, or polymer polyol derived from the reaction involving acrylonitrile or vinylbenzene. These polyols may be used separately or in combination. The foaming liquid (urethane stock solution) generally comprises 25-80 parts by weight of isocyanates, 2-20 parts by weight of a crosslinking agent, 0.5-10 parts by weight of a blowing agent, and 0.3-3.0 parts by weight of a catalyst per 100 parts by weight of polyols.

Isocyanates used in the present invention are conventional per se. Eligible isocyanates include aromatic polyisocyanate (tolylenediisocyanate, diphenylmethanediisocyanate, etc) and denatured aromatic polyisocyanate (carbodiimide modified, isocyanurate modified, etc.), and prepolymer containing free isocyanate obtained by reacting polyfunctional active hydrogen compound with the above-mentioned aromatic polyisocyanate or denatured aromatic polyisocyanate. These isocyanates may be used separately or in combination.

The amount of isocyanates used is determined depending on the type of the polyol used, the type and amount of the crosslinking agent to be added, the amount of the blowing agent (gas evolving substance), and the type of the isocyanate used. In general, the amount of isocyanates is in the range of 25-80 parts by weight, and preferably 50-70 parts by weight, per 100 parts by weight of the polyol component.

The blowing agent, that is, a substance which evolves gas when it is reacted with the isocyanates is not restrictive but preferably comprises water because water is available anywhere at negligible cost. Water is used singly or in combination with a finely-powdered water absorptive resin such as isobutylene, maleic anhydride copolymer such as for example a product commercially available as KI Gel 2OIK-F2 from Kuraray Co., Ltd., acrylic vinyl alcohol copolymer such as for example a product commercially available as SP-520 from Sumitomo Chemicals Industries Ltd., or acrylic sodium carbonate polymer such as for example a product commercially available as NP-1010 from Sumitomo Chemical Industries Ltd. In the latter instance, 0.5-10 parts by weight of such finely-powdered water absorptive resin is added as an effective component to polyol component. The water absorptive resin thus added swells to absorb a large amount of water and retards the reaction between isocyanates and water, hence is attributable to the formation of a urethane foam article having a high density outer surface layer for the reasons described below. The high water absorptive resin is a polyelectrolyte which is capable of absorbing water more than several ten times to one thousand times as much as its own weight. Due to an osmotic pressure created by the salt effect of functional groups such as carboxylic sodium carbonate contained in its structure and a strong affinity between water and the polyelectrolyte, the water absorptive resin absorbs water rapidly and forms a hydrogel. A more specific description will be given to the water absorbing mechanism of the acrylic vinyl alcohol copolymer. Since the acrylic vinyl alcohol copolymer has a structure composed of chains of inonic water soluble electrolytic polymer loosely linked together, the water absorbing mechanism comprises an ironic network of polyelectolyte, movable ions of the opposite polarity, and water retained in the ironic network. When the acrylate phase swells, the polyvinyl alcohol phase is stretched or otherwise crystallized under orientation, thereby forming a complex structure in which the polyacrylate portion saturated with water is supported by the crystallized polyvinylalcohol portion. In the case of use of the water absorptive resin, it is preferred that when a mixture of a primary component composed of isocyanates, a secondary component composed of polyols, water and/or a water absorptive resin, a foam stabilizer, a pigment, and a crosslinking agent is homogeneously stirred before the pouring, a tertiary component composed of a catalyst diluted with polyols and the like is added and stirred instantaneously.

Eligible materials for the crosslinking agent used as an assistant may include low-molecular polyols such as triethanolamine, diethanolamine or the like amino low-molecular polyol, ethylene glycol, diethylene glycol, butanediol, trimethylolpropane, and glycerin. These low-molecular polyols may be used separately or in combination. The amount of the crosslinking agent in this invention varies depending on the type of a crosslinking agent used. In the case of the formation of a semi-rigid urethane foam article having a high density outer surface layer, the amount of the low-molecular polyol is in the range of 2-20 parts by weight, and preferably 3-10 parts by weight per 100 parts by weight of the conventional polyol component.

In the manufacture of the urethane foam article according to the invention, an emulsifying agent, a stabilizer, a foam stabilizer composed of a surfactant, a filler, a colorant, an oxidative stabilizer and any other assistant may be used, if necessary. Furthermore, it is possible to use a low-melting solvent as a blowing agent in combination with the gas evolving substances described above.

As described above, according to the method of the present invention, the temperature of a mold is maintained in a certain range and a temperature sensitive catalyst is used to create an overpacking condition after the pouring of a plastic liquid into the mold. Thus, a urethane foam article having a high density outer surface layer can be prepared without using or with a considerably limited use of a conventional catalyst consisting of CFC-11 or CFC-113, thereby preventing environmental disruption. Furthermore, the present method, as against the conventional methods, is free from a danger of firing or combustion, and requires no additional process for heating of a semi-finished product to remove a combustible gas. Yet, the method of the invention does not use a chloric low-melting solvent and hence can easily accommodate problems of the toxicity and rusting without reconstruction the conventional equipment.

EXAMPLES

For a better understanding of the present invention, the following examples are provided.

INVENTIVE EXAMPLE

A liquid mixture was prepared by mixing 94 grams of tri-functional polyetherpolyol (Sumiphen-3063; OHV-$28^{mgK-OH}$/g manufactured by Sumitomo Bayer Urethane Co., Ltd.) and 6 grams of ethylene glycol (first grade reagent) as polyols, 0.3 grams of a silicone foam stabilizer (L-5305 manufactured by Nippon Unicar Co., Ltd.) as a foam stabilizer, 1.95 grams of distilled water as a blowing agent, and 1.2 grams of PolyCAT42 (manufactured by Air Products and Chemicals, Inc. and sold by San-Apro Limited) as a catalyst. To the mixture maintained at 20° C., 64.3 grams of crude MDI (MDI-CR-200 manufactured by Mitsui Toatsu Chemicals, Inc.) was added as isocyanates while being maintained at 20° C., and immediately thereafter the resultant mixture was homogeneously mixed by a homomixer for 6 seconds. The homogeneous mixture thus obtained was immediately poured into an aluminum mold with a lockable cover or lid of 20 mm thick (effective space size = 10 mm in thickness × 160 mm in width × 120 mm in length. The lid of the mold was then closed and clamped to withstand the blowing pressure. After the poured mixture was allowed to stand for 10 minutes, the lid was opened and a foamed article was removed from the mold. The foamed article was cut across the thickness thereof for observation of the cross section of the foamed article. The observation indicated that the foamed article was a semi-rigid urethane foam article having an adequately formed high density outer surface layer of 1.2 mm in average thickness and a homogeneous finely-divided cellular structure. Properties of the urethane foam article thus obtained are shown in Table 1.

TABLE 1

| | |
|---|---|
| Total Average Density (g/cm$^3$) | 0.49 |
| Density of High Density Layer (g/cm$^3$) | 0.70 |
| Density of Inner Foam Layer (g/cm$^3$) | 0.41 |
| Hardness JIS-C Type | 79 |

Reactivity of the liquid mixture used for the pouring into the mold is shown in Table 2.

TABLE 2

| | |
|---|---|
| Cream Time | 10 seconds |
| Rise Time | 52 seconds |
| Tack-free Time | 52 seconds |

As noted above, the article obtained by the Inventive Example 1 was a semi-rigid urethane foam article having an adequately formed high density outer surface layer.

COMPARATIVE EXAMPLES 1 AND 2

For comparative purposes, two foam articles were prepared using a conventional low-melting blowing agent CFC-11 in combination with a mold maintained at 20° C. (Comparative Example 1) and with the same mold maintained at 55° C. (Comparative Example 2).

A liquid mixture maintained at 20° C. was prepared by mixing 94 grams of tri-functional polyetherpolyol Sumiphen-3063; OHV-$28^{mgK-OH}$/g manufactured by Sumitomo Bayer Urethane Co., Ltd) and 6 grams of ethylene glycol (first grade reagent) as polyols, 0.5 grams of a silicone foam stabilizer (L-5305 manufactured by Nippon Unicar Co., Ltd.) as a foam stabilizer, 15 grams of a low-melting solvent CFC-11 (Asahiflon-11 manufactured by Asahi Glass Company) as a blowing agent, and 0.6 grams of Dabco-33LV (manufactured by Sankyo Air Products Co., Ltd.) and 0.02 grams of U-100 (manufactured by Nitto Kasei Co., Ltd.) as catalysts. To the liquid mixture maintained at 20° C., 33.8 grams of crude MDI (MDI-CR-200 manufactured by Mitsui Toatsu Chemicals, Inc.) was added as isocyanates while being maintained at 20° C., and immediately thereafter the resultant mixture was homogeneously mixed up by a homomixer for 6 seconds. The homogeneousl mixture thus obtained was immediately poured into two molds which were the same as that used in Inventive Example 1 but differed therefrom in that the molds were maintained at 20° C. in Comparative Example 1 and at 55° C. in Comparative Example 2. The lid of the mold was then closed and clamped so as to withstand the blowing pressure. After the poured mixture was allowed to stand for 10 minutes, the lid was opened and a foamed article was removed from the mold. The foamed article obtained in each of the Comparative Examples 1 and 2 was cut across the thickness thereof for observation of the cross section of the foamed article. The observation indicated that the foamed article obtained by the Comparative Example 1 (in which the mold temperature was maintained at 20° C.) was totally unacceptable as a final product because the outer surface layer was sticky and includes coarse cells providing an appearance of frost columns. The foamed article obtained by the Comparative Example 2 (in which the mold temperature was maintained at 55° C.) had the properties shown in Table 3.

TABLE 3

| | |
|---|---|
| Total Average Density (g/cm$^3$) | 0.48 |
| Density of High Density Layer (g/cm$^3$) | 0.73 |
| Density of Inner Foam Layer (g/cm$^3$) | 0.40 |
| Hardness JIS-C Type | 70 |

Reactivity of the liquid mixture used for the pouring into the mold is shown in Table 4.

TABLE 4

| Mold Temperature | 20° C. | 55° |
|---|---|---|
| Cream Time | 10 seconds | 10 seconds |
| Rise Time | 52 seconds | 43 seconds |
| Tack-free Time | 52 seconds | 50 seconds |

As noted above, the article obtained by Comparative Example 2 in which the mold temperature was maintained at 55° was a semi-rigid urethane foam article having an adequately formed high density outer surface layer, as comparable to the foam article obtained by the Inventive Example 1.

INVENTIVE EXAMPLE 2

A foam article was prepared using the procedure set forth in Inventive Example 1 except that PolyCAT42 used as a catalyst was substituted in the manner as shown in Table 5(a). The foam article was then cut across the thickness thereof for observing the cross section of the foam article. The observation indicated that as in the case of the Inventive Example 1, the foamed article was a semi-rigid urethane foam article having a high density outer surface layer of 1.0 mm average thickness and a homogeneous cellular structure.

The foam article produced was characterized as shown in Table 6.

COMPARATIVE EXAMPLES 3 AND 4

For comparative purposes, two foam articles were prepared using conventional catalysts such as Dabco33LV, U-100 and PolyCAT9 (manufactured by Air Products and Chemicals, Inc. and sold by San-Apro Limited) in combination with a mold maintained at 20° C. (Comparative Example 3) and with the same mold maintained at 55° C. (Comparative Example 4). In that instance, a conventional low-melting blowing agent such as CFC-11 or CFC-113 was not used. Various conditions of the Comparative Examples 3 and 4 are shown in Tables 5(a) and 5(b) for purposes of comparison with conditions required by the Inventive Example 2.

The foam articles produced by the Comparative Examples 3 and 4 were characterized as shown in Table 6 in comparison with the foam article produced by the Inventive Example 2.

TABLE 5(a)

| | | | Unit: Grams |
|---|---|---|---|
| Formulation "A" | Inventive Example 2 | Comparative Example 3 | Comparative Example 4 |
| Sumiphen-3063 | 94.0 | 94.0 | 94.0 |
| Ethylene Glycol | 6.0 | 6.0 | 6.0 |
| Dabco33LV | — | 0.5 | 0.6 |
| U-100 | — | 0.01 | — |
| PolyCAT-9 | — | — | 0.6 |
| 1,1'-(oxydiethylene) bis(2-methylimidazole | 0.7 | — | — |
| 1,8-diazabicyclo (5,4,0)-7-undecene | 0.3 | — | — |
| Distilled Water | 1.95 | 1.95 | 1.95 |
| L-5305 | 0.30 | 0.30 | 0.30 |

TABLE 5(b)

| | | | Unit: Grams |
|---|---|---|---|
| Formulation "B" | Inventive Example 2 | Comparative Example 3 | Comparative Example 4 |
| MDI-CR-200 | 64.3 | 64.3 | 64.3 |
| Mold Temperature | 20° C. | 20° C. | 55° C. |

TABLE 6

| | Inventive Example 2 | Comparative Example 3 | Comparative Example 4 |
|---|---|---|---|
| Average Thickness of High Density Layer (mm) | 1.0 | Thin Skin <0.1 | Thin Skin <0.1 |
| Total Average Density (g/cm$^3$) | 0.473 | 0.480 | 0.483 |
| Density of High Density Layer (g/cm$^3$) | 0.700 | — | — |
| Density of Inner Foam Layer (g/cm$^3$) | 0.413 | 0.474 | 0.478 |
| Hardness JIS-C Type | 78 | 73 | 73 |

As is apparent from Table 6, the conventional catalysts failed to form a desired high density outer surface layer.

Reactivity of the liquid mixtures used for pouring into the mold is shown in Table 7.

TABLE 7

| | Inventive Example 2 | Comparative Example 3 | Comparative Example 4 |
|---|---|---|---|
| Cream Time | 10 seconds | 9 seconds | 8 seconds |
| Rise Time | 58 seconds | 62 seconds | 56 seconds |
| Tack-free Time | 62 seconds | 85 seconds | 77 seconds |

The liquid mixtures prepared by the above-mentioned formulations "A" and "B" were poured into an aluminum box or container having a thickness of 20 mm and maintained at a temperature of 20° C. and allowed to foam freely. During the foaming, measurement was made by the extent of rising comparatively between an outer surface layer contacting the aluminum container and an inner layer held out of contact with the aluminum container. Results obtained are shown in FIG. 2 in terms of rising curves.

In FIG. 2, the solid lines are rising curves plotted at the outer surface layers relative to time while the broken line is a rising curve plotted at the inner layer relative to time. The Inventive Example 2 exhibited two rising curves (b) and (a), while the Comparative Examples 3 and 4 exhibited two rising curves (b) and (c). As is apparent from the rising curves (b) and (a) shown in FIG. 2, the Inventive Example 2 produced a high density outer surface layer. This was partly because a difference in reaction in a same foamable liquid mixture was positively induced by properly selecting the type of catalyst, the mold temperature and the type of assistant, and partly because the inner layer or part of the foamable liquid mixture was allowed to foam and gel to thereby create an over-packing. Under such condition, the outer surface layer, that is, an outer part of the foamable liquid mixture held in contact with the mold surface, which had been unfoamed or under-foamed, was gelled rapidly while retarded in its foaming reaction. Thus, a high density outer surface layer was formed.

For gelation of the same layer, namely the gelation of the inner layer or the gelation of the outer surface layer, a large difference in reaction such as shown by the rising curves (b) and (a) is no longer needed. A smaller difference in reaction is preferred instead.

For comparative purposes, an foam article was prepared using the procedure set forth in the Inventive Example 2 except that the amount of formable liquid mixture was limited to such an extent that the mold was just filled with the foamable liquid mixture, thereby considerably lowering the over-packing rate. The foam article produced did not have a high density outer surface layer of even thickness due to insufficient inhibition or retarding of the foaming of an outer part of the foamable liquid mixture. The foam article was similar to conventional foam having a thin skin except that it had a complex structure composed of a low density surface layer, a narrow boundary layer and a low density inner foam layer arranged in the order mentioned.

INVENTIVE EXAMPLE 3

Foam articles were prepared using the conditions and procedure set forth in Inventive Example 1 except that 1,2-dimethylimidazole and U-CATSA1, and a water absorptive resin saturated with water were added respectively as catalysts and a blowing agent in preparation of first, second and third formulations, as tabulated in Table 8. The foam articles produced were cut across the thickness thereof for observation of the cross-sectional construction of the same. The observation indicated that the form articles were homogeneous semi-rigid urethane foam articles having a 1.0–1.2 mm high density outer surface layer, as in the case of Inventive Example 1.

Properties of the urethane foam articles thus obtained are shown in Table 9.

TABLE 8

Unit: grams

| | Formulation No. 1 | Formulation No. 2 | Formulation No. 3 |
|---|---|---|---|
| First Component | | | |
| Sumiphen-3063 | 86.0 | 86.0 | 86.0 |
| 1,4-butanediol (first grade reagent) | 4.0 | 4.0 | 4.0 |
| Distilled Water | 1.95 | 1.95 | 1.95 |
| Foam Stabilizer L-5305 | 0.3 | 0.3 | 0.3 |
| Water Absorptive Resin KIgel-201K-F2 (Kuraray Co., Ltd.) | 2.0 | — | — |
| Water Absorptive Resin NP-1010 (Sumitomo Chemical Industries, Ltd.) | — | 2.0 | — |
| Second Component | | | |
| Sumiphen-3063 | 10.00 | 10.00 | 10.00 |
| 1,2-dimethylimidazole (first grade reagent) | 0.5 | 0.5 | 0.5 |
| U-CATSA1 | 0.4 | 0.4 | 0.4 |
| Third Component MDI-CR-200 | 50 | 50 | 50 |

TABLE 9

| | Formulation No. 1 | Formulation No. 2 | Formulation No. 3 |
|---|---|---|---|
| Total Average Density (g/cm$^3$) | 0.60 | 0.58 | 0.60 |
| Density of High Density Layer (g/cm$^3$) | 0.64 | 0.65 | 0.65 |
| Density of Inner Foam Layer (g/cm$^3$) | 0.50 | 0.48 | 0.49 |
| Hardness JIS-C Type | 76 | 76 | 76 |

The reactivity of the respective liquid mixtures used are shown in Table 10.

TABLE 10

| | Formulation No. 1 | Formulation No. 2 | Formulation No. 3 |
|---|---|---|---|
| Cream Time | 25 seconds | 25 seconds | 18 seconds |
| Rise Time | 120 seconds | 130 seconds | 90 seconds |
| Tack-free Time | 160 seconds | 172 seconds | 125 seconds |

As evidenced from Table 10, the water absorptive resin is greatly contributable to the provision of an enhanced inhibition of the foaming reaction.

INVENTIVE EXAMPLE 4

An example for the formation of a rigid urethane foam article having a high density outer surface layer will be described below.

A liquid mixture was prepared by adding together 90 grams of pentaerysthritol type polyether polyol (PE-450, OHV=450$^{mgK-OH}$/g manufactured by Mitsui Toatsu Chemicals, Inc.) and 10 of ethylenediamine type polyether polyol(Actcol GR-07, OHV=760$^{mgK-OH}$/g manufactured by Takeda Chemical Industries, Ltd.) as polyols, 1.0 grams of silicone foam stabilizer (F-305 manufactured by Shin-etsu Chemical Industries, Ltd.) as a foam stabilizer, 1.0 grams of distilled water as a blowing agent, 0.6 grams of 1,2-dimethylimidazole and 0,6 grams of U-CATSA1 as catalysts. To the liquid mixture maintained at 20° C., 134 grams of MDI-CR-200 was added as isocyanates while being maintained at 20° C., and immediately thereafter the resultant mixture was homogeneously mixed by a homomixer for 8 seconds. The homogeneous mixture thus obtained was immediately poured into two aluminum molds which were the same as that used in Inventive Example 1 but differed therefrom in that the molds were maintained at 20° C. and at 30° C. The lid of each mold was then closed and clamped to withstand the blowing pressure. After the poured mixture was allowed to stand for 10 minutes (for curing), the lid was opened and a foamed article was removed from the mold. Each of the foamed articles was cut across the thickness thereof for observation of the cross section of the foamed article. The observation indicated that the foamed articles were rigid urethane foam articles having an adequately formed high density outer surface layer of 1.2 mm average thickness and a homogeneous cellular structure. Properties of the urethane foam articles thus obtained are shown in Table 11.

TABLE 11

| Mold Temperature | 20° C. | 30° C. |
|---|---|---|
| Total Average Density (g/cm$^3$) | 0.625 | 0.550 |
| Density of High Density Layer (g/cm$^3$) | 0.800 | 0.720 |
| Density of Inner Foam Layer (g/cm$^3$) | 0.463 | 0.400 |
| Hardness JIS-C Type | >95 | >95 |

Reactivity of the liquid mixture used for the pouring into the mold is shown in Table 12.

TABLE 12

| Cream Time | 30 seconds |
|---|---|
| Rise Time | 80 seconds |
| Tack-free Time | 90 seconds |

Obviously, various minor changes and modifications of the present invention are possible in the light of the above teaching. It is therefore to be understood that within the scope of the appended claims the invention may be practiced otherwise than as specifically described.

What is claimed is:

1. A method of preparing a urethane foam article having a high density outer surface layer comprising the steps, of mixing a plastic liquid containing isocyanates, polyols, a catalyst, a blowing agent, pouring said plastic liquid into a mold,
   maintaining the mold at a temperature in the range of from 15° to 40° C.; catalyst for causing the isocyanates and the blowing agent to create a difference in chemical reaction between an outer portion of the plastic liquid contacting the mold surface and an inner portion of the plastic liquid held out of contact with the mold surface, thereby retarding the foaming of the outer portion more than that of the inner portion while maintaining said mold in the range from 15° to 40° C., closing said mold and subsequently allowing an evolved gas to expand under exothermic heat of the inner portion of the plastic liquid and simultaneously taking up the evolved gas by gelation of the plastic liquid, thereby increasing the blowing pressure rapidly until the mold is over-packed with a foaming plastic mass; and
   gelling an outer portion of the foaming plastic mass extending along the mold surface while inhibiting the foaming of the last-mentioned outer portion, thereby forming a high density layer on the outer surface of a urethane foam article, wherein said temperature sensitive catalyst has a strong temperature dependency when reacted with the blowing agent and further has a small temperature dependency and creates a relatively small difference in the chemical reaction when it is reacted with isocyanates, polyols, and a crosslinking agent, wherein said temperature sensitive catalyst is N,N',N''-tris(dimethylaminopropyl)hexahydro -S-triazine or a combination thereof, and wherein said blowing agent is water.

2. A method according to claim 1 wherein said temperature sensitive catalyst further includes an imidazole ether compound.

3. A method according to claim 2 wherein said temperature sensitive catalyst further includes a material selected from the group consisting of a 1-substituted imidazole compound, 1,8-diazabicyclo(5,4,0)-7-undecene or an organic acid salt thereof.

4. A method according to claim 1 wherein said temperature sensitive catalyst further includes a material selected from the group consisting of a 1-substituted imidazole compound, 1,8-diazabicyclo(5,4,0)-7-undecene or an organic acid salt thereof.

5. A method according to claim 1 wherein the plastic liquid is maintained at a temperature in the range of 15-30° C.

6. A method according to claim 1 wherein the plastic liquid is maintained at a temperature in the range of 15-30° C.

7. A method according to claim 1 wherein said blowing agent is water absorbed in a water absorptive resin.

8. A method of preparing a urethane foam article having a high density outer surface layer comprising the steps, of mixing a plastic liquid containing isocyanates, polyols, a catalyst, a blowing agent, pouring said liquid into a mold maintaining the mold at a temperature in the range of from 15° to 40° C.; adding a temperature sensitive catalyst for causing the isocyanates and the blowing agent to create a difference in chemical reaction between an outer portion of the plastic liquid contacting the mold surface and an inner portion of the plastic liquid held out of contact with the mold surface, thereby retarding the foaming of the outer portion more than that of the inner portion while maintaining said mold in the range from 15° to 40° C., closing said mold and subsequently allowing an evolved gas to expand under exothermic heat of the inner portion of the plastic liquid and simultaneously taking up the evolved gas by gelation of the plastic liquid, thereby increasing the blowing pressure rapidly until the mold is over-packed with a foaming plastic mass; and gelling an outer portion of the foaming plastic mass extending along the mold surface while inhibiting the foaming of the last-mentioned outer portion, thereby forming a high density layer on the outer surface of a urethane foam article, wherein said temperature sensitive catalyst has a strong temperature dependency when reacted with the blowing agent and further has a small temperature dependency and creates a relatively small difference in the chemical reaction when it is reacted with isocyanates, polyols, and a crosslinking agent, wherein said temperature sensitive catalyst is an imidazole ether compound, and wherein said blowing agent is water.

9. A method according to claim 8 wherein said temperature sensitive catalyst further includes a material selected from the group consisting of a 1-substituted imidazole compound, 1,8-diazabicyclo(5,4,0)-7-undecent or an organic acid salt thereof.

10. A method according to claim 8 wherein the plastic liquid is maintained at a temperature in the range of 15-30° C.

11. A method according to claim 8 wherein said blowing agent is water absorbed in a water absorptive resin.

* * * * *